(12) United States Patent
Cutler et al.

(10) Patent No.: US 10,173,933 B2
(45) Date of Patent: Jan. 8, 2019

(54) RAPID DRYING OF CERAMIC GREENWARES

(71) Applicant: Corning Incorporated, Corning, NY (US)

(72) Inventors: Willard Ashton Cutler, Elmira, NY (US); James Anthony Feldman, Campbell, NY (US); Jacob George, Horseheads, NY (US); Amit Halder, Ithaca, NY (US); Nadezhda Pavlovna Paramonova, Saint-Petersburg (RU); Todd Parrish St Clair, Painted Post, NY (US)

(73) Assignee: Corning Incorporated, Corning, NY (US)

(*) Notice: Subject to any disclaimer, the term of this patent is extended or adjusted under 35 U.S.C. 154(b) by 1050 days.

(21) Appl. No.: 14/230,756

(22) Filed: Mar. 31, 2014

(65) Prior Publication Data

US 2014/0327186 A1    Nov. 6, 2014

Related U.S. Application Data

(60) Provisional application No. 61/819,824, filed on May 6, 2013.

(51) Int. Cl.
*F26B 21/00* (2006.01)
*F26B 3/347* (2006.01)
(Continued)

(52) U.S. Cl.
CPC ............ *C04B 38/02* (2013.01); *B28B 11/241* (2013.01); *B28B 11/243* (2013.01); *C04B 33/30* (2013.01);
(Continued)

(58) Field of Classification Search
CPC .... F26B 3/347; F26B 21/006; F26B 2210/02; C04B 38/02; C04B 35/195; C04B 35/20;
(Continued)

(56) References Cited

U.S. PATENT DOCUMENTS 4,439,929 A    4/1984   Kitagawa et al. .................. 34/1
4,857,245 A    8/1989   Oshima et al. ................. 264/25
(Continued)

FOREIGN PATENT DOCUMENTS

CN    1945183    4/2007
CN    201724523    1/2011
(Continued)

OTHER PUBLICATIONS

English Translation of CN201480038596.2 Notice of First Office Action dated Nov. 10, 2016; 13 pages; Chinese Patent Office.
(Continued)

*Primary Examiner* — Jessica Yuen

(57) ABSTRACT

Systems and methods for rapid drying of ceramic greenwares having a high graphite content are disclosed. The methods include employing microwave drying to bring the dryness of the ceramic greenware to a first select dryness and then employing close-coupled hot-air drying to bring the dryness to the final target dryness. The judicious use of close-coupled hot-air drying reduces end defects due to unevenness in the microwave drying process while also substantially speeding up the drying process. Various configurations for and combinations of microwave drying and close-coupled hot-air drying are disclosed.

12 Claims, 12 Drawing Sheets

(51) Int. Cl.
*C04B 33/30* (2006.01)
*B28B 11/24* (2006.01)
*C04B 38/02* (2006.01)
*C04B 35/195* (2006.01)
*C04B 35/20* (2006.01)

(52) U.S. Cl.
CPC ............ *C04B 35/195* (2013.01); *C04B 35/20* (2013.01); *F26B 3/347* (2013.01); *F26B 21/006* (2013.01); *C04B 2235/425* (2013.01); *C04B 2235/606* (2013.01); *C04B 2235/6021* (2013.01); *C04B 2235/61* (2013.01); *F26B 2210/02* (2013.01)

(58) Field of Classification Search
CPC ................ C04B 33/30; C04B 2235/61; C04B 2235/425; C04B 2235/6021; C04B 2235/606; B28B 11/241; B28B 11/243
See application file for complete search history.

(56) References Cited

U.S. PATENT DOCUMENTS

| | | | |
|---|---|---|---|
| 5,263,263 A | 11/1993 | Gheorghiu et al. | 34/1 |
| 5,946,817 A | 9/1999 | Sato | 34/267 |
| 6,768,089 B2* | 7/2004 | Minobe | H05B 6/78 219/699 |
| 6,878,337 B2 | 4/2005 | Noguchi et al. | |
| 6,932,932 B2 | 8/2005 | Miura et al. | |
| 7,364,689 B2 | 4/2008 | Noguchi et al. | |
| 7,422,719 B2* | 9/2008 | Chan | C04B 35/195 264/630 |
| 7,603,793 B2 | 10/2009 | Hoshino et al. | 34/245 |
| 7,842,227 B2 | 11/2010 | Kasai et al. | |
| 8,075,829 B2 | 12/2011 | Takagi et al. | 264/432 |
| 9,085,091 B2 | 7/2015 | Okazaki | |
| 2007/0045910 A1 | 3/2007 | Noguchi et al. | |
| 2008/0115383 A1 | 5/2008 | Nate et al. | 34/406 |
| 2008/0136062 A1 | 6/2008 | Kasai et al. | 264/426 |
| 2009/0079111 A1* | 3/2009 | Kasai | B28B 11/243 264/489 |
| 2009/0235552 A1 | 9/2009 | Takagi et al. | 34/437 |
| 2009/0294438 A1 | 12/2009 | Adrian | 219/681 |
| 2010/0029462 A1 | 2/2010 | Derosa et al. | |
| 2011/0227256 A1 | 9/2011 | Okumura et al. | 264/414 |

FOREIGN PATENT DOCUMENTS

| | | |
|---|---|---|
| CN | 102847560 | 1/2013 |
| DE | 3623511 A1 | 7/1986 |
| EP | 1826517 A1 | 2/2006 |
| EP | 2168741 A2 | 9/2009 |
| JP | 2005272158 A | 10/2005 |
| JP | 2007229709 A | 9/2007 |
| JP | 2008110541 A | 5/2008 |
| WO | 2008088013 A1 | 7/2008 |
| WO | 2012023617 A1 | 2/2012 |

OTHER PUBLICATIONS

English Translation of JP2017162098 Office Action dated Aug. 28, 2018, Japan Patent Office, 1 Pg.

* cited by examiner

RAPID DRYING OF CERAMIC GREENWARES

This application claims the benefit of priority under 35 U.S.C. § 119 of U.S. Provisional Application Serial No. 61/819,824 filed on May 6, 2013 the content of which is relied upon and incorporated herein by reference in its entirety.

FIELD

The present disclosure relates to drying ceramic greenwares, and in particular relates to systems and methods for rapid drying of ceramic greenwares that have a high graphite content.

BACKGROUND

Ceramic greenwares having an array of microchannels are formed by extrusion and then processed (i.e., dried and fired) to form ceramic articles, such as filters and catalytic converters for exhaust-producing engines and related applications. Ceramic greenwares can be formed by extruding a plasticized batch comprising ceramic-forming components, or ceramic precursors, through a die, such as a die that produces a honeycomb structure, to form an extrudate of the ceramic-forming material. The extrudate that exits the extruder is cut transversely to the direction of extrusion to form a greenware piece. The piece may itself be transversely cut into shorter pieces after drying. In some cases, the longer piece is referred to as a "log." Extruded pieces of greenware contain water (for example, 10%-25% by weight), and the greenware needs to be dried prior to the formation of the final product (article). In some cases, the ceramic greenware needs to be dried to greater than 98% (i.e., to having less than 2% moisture content by weight).

Certain ceramic greenwares have a relatively high graphite content and are used to make articles having a higher porosity, thinner channel walls and overall lower thermal mass for fast light off. However, increased levels of graphite in the batch make the resulting ceramic greenwares challenging to dry. In particular, the microwave drying of high-graphite ceramic greenwares tends to be non-uniform and can result in overheating that can damage the greenware.

SUMMARY

The systems and methods herein are directed to the rapid and substantially defect-free drying of low-thermal-mass ceramic greenwares formed by extrusion. This disclosure also enhances drying times for standard products. This inventive drying is achieved by the combination of microwave drying and forced-hot-air drying through the cell channels once exterior shrinkage is largely complete. The systems can be retrofitted on existing dryers.

An aspect of the disclosure includes a method of drying an extruded ceramic greenware having an array of open longitudinal cells and opposite input and output ends. The method includes: performing at least one microwave drying of the ceramic greenware to a dryness of about 70% to form a partially dried ceramic greenware; operably arranging the input end of the partially dried ceramic greenware relative to an output end of a close-coupled hot-air (CCHA) drying system to define a coupling distance $\Delta x$ having a value in a range defined by $-2"\leq \Delta x \leq 10"$; performing at least one CCHA drying of the partially dried ceramic greenware to form a dried ceramic greenware having a target dryness of at least 98% by passing CCHA through the ceramic greenware from the input end to the output end; and wherein the ceramic greenware has dielectric constant $\varepsilon=\varepsilon'+i\varepsilon''$ that defines a loss tangent $\tan(\delta)=\varepsilon''/\varepsilon'\geq 0.05$.

Another aspect of the disclosure is a method of drying an extruded ceramic greenware having an array of open longitudinal cells and opposite input and output ends. The method includes: drying the ceramic greenware to form a partially dried ceramic greenware having a dryness of 10% or less, wherein the drying includes performing a first close-coupled hot-air (CCHA) drying with a coupling distance $\Delta x$ having a value in a range defined by $-2"\leq \Delta x \leq 10"$ ($-5.07$ cm$\leq \Delta x \leq 25.4$ cm); drying the partially dried ceramic greenware to a target dryness of at least 98% to form a dried ceramic greenware, wherein drying the partially dried ceramic greenware includes performing at least one of microwave drying and at least a second CCHA drying; and wherein the ceramic greenware from 0% to 10% dryness has a dielectric constant $\varepsilon=\varepsilon'+i\varepsilon''$ that defines a loss tangent $\tan(\delta)=\varepsilon''/\varepsilon'\geq 0.05$.

Another aspect of the disclosure is a method of drying an extruded ceramic greenware having an array of open longitudinal cells and opposite input and output ends. The method includes: a) drying the ceramic greenware to form a partially dried ceramic greenware by performing one of microwave drying and close-coupled hot-air (CCHA) drying, wherein the CCHA drying is performed with a coupling distance $\Delta x$ having a value in a range defined by $-2"\leq \Delta x \leq 10"$ ($-5.07$ cm$\leq \Delta x \leq 25.4$ cm); b) drying the partially dried ceramic greenware to a target dryness of at least 98% to form a dried ceramic greenware using the other of the microwave drying or CCHA drying performed in a); and c) wherein the ceramic greenware has a dielectric constant $\varepsilon=\varepsilon'+i\varepsilon''$ that defines a loss tangent $\tan(\delta)=\varepsilon''/\varepsilon'\geq 0.05$.

Another aspect of the disclosure is an apparatus for drying an extruded ceramic greenware having an array of open longitudinal cells and opposite input and output ends. The apparatus includes: at least one applicator adapted to perform microwave drying of the ceramic greenware to form a partially dried ceramic greenware; at least one applicator adapted to perform close-coupled hot-air (CCHA) drying with a coupling distance $\Delta x$ having a value in a range defined by $-2"\leq \Delta x \leq 10"$ ($-5.07$ cm$\leq \Delta x \leq 25.4$ cm) and adapted to dry the partially dried ceramic greenware to a target dryness of at least 98% to form a dried ceramic greenware; and wherein the ceramic greenware has a dielectric constant $\varepsilon=\varepsilon'+i\varepsilon''$ that defines a loss tangent $\tan(\delta)=\varepsilon''/\varepsilon'\geq 0.05$.

Another aspect of the disclosure includes an apparatus for drying an extruded ceramic greenware having an array of open longitudinal cells and opposite input and output ends. The apparatus includes: at least one applicator adapted to perform close-coupled hot-air (CCHA) with a coupling distance $\Delta x$ having a value in a range defined by $-2"\leq \Delta x \leq 10"$ ($-5.07$ cm$\leq \Delta x \leq 25.4$ cm) and adapted to dry the greenware to form a partially ceramic greenware having up to 10% dryness; at least one applicator adapted to perform microwave drying of the partially dried ceramic greenware to a target dryness of 98% or greater; and wherein the ceramic greenware from 0% to 10% dryness has a dielectric constant $\varepsilon=\varepsilon'+i\varepsilon''$ that defines a loss tangent $\tan(\delta)=\varepsilon''/\varepsilon'\geq 0.05$.

These and other advantages of the disclosure will be further understood and appreciated by those skilled in the art by reference to the following Detailed Description, claims and appended drawings.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

Cartesian coordinates are provided in some of the Figures for the sake of reference and for ease of description and are not intended to be limiting as to direction or orientation.

In the discussion below, the term "dryness" refers to an average dryness, which can be determined by weighing a wet ceramic greenware to establish a starting weight, then drying the greenware, then weighing the ceramic greenware again to compare the weight loss as a percentage of the starting weight.

Figure 1:
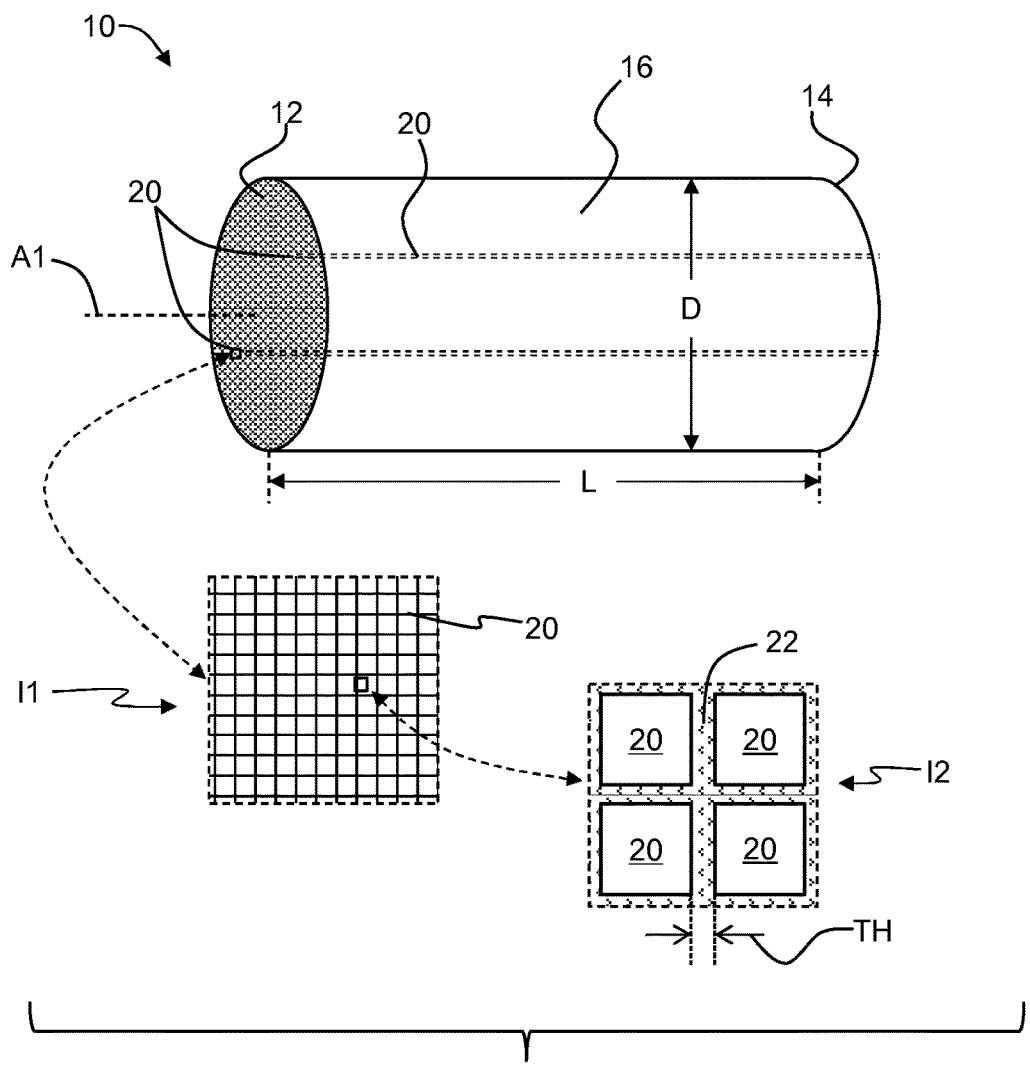
FIG. 1 is an isometric front view of a ceramic greenware and includes two close-up inset views 11 and 12 that show the details of the longitudinal cells.

FIG. 1 is an isometric front view of an example ceramic greenware 10. As used herein, the term "ceramic greenware," or greenware, refers to bodies comprised of ceramic-forming components that form ceramic bodies when fired at high temperature.

The ceramic greenware 10 has a central axis A1, a front end 12, a back end 14, and an outer surface 16. The ceramic greenware 10 has an array of longitudinally running cells 20 that are open at front and back ends 12 and 14 of the greenware (see first close-up inset 11). The cells 20 are defined by cell walls 22 (see second close-up inset 12). In an example, cells 20 form a honeycomb structure.

In an example embodiment, the ceramic greenwares 10 considered herein have the following properties: a length L=5" to 50" (12.7 cm to 127 cm), a diameter D=3" to 20" (7.62 cm to 35.56), a cell density ρ=100 to 900 cells per square inch, and a cell-wall thickness TH=1 to 15 mil (25.4 microns to 381 microns).

The ceramic greenware 10 (or the ceramic batch from which the greenware is formed) may comprise ceramic components, such as a mixture of various ceramic-forming components and a ceramic component. The various components can be mixed together with a liquid vehicle, such as water, and extruded with a formed shape such as a honeycomb structure. Immediately after extrusion, the greenware contains some liquid (e.g., water), and typically at least some of the liquid must be removed and the greenware must be dried prior to firing at high temperature, which forms a refractory material.

The ceramic greenwares 10 are considered herein to have a certain amount of loss characterized as a function of ε' and ε" (i.e., the real and imaginary parts of the dielectric constant ε=ε'+iε") by the relationship tan(δ)=ε"/ε'. In one example of ceramic greenware 10, tan(δ)=ε"/ε'≥0.05, while in another example, tan(δ)≥0.08. In an example embodiment, ceramic greenware 10 includes graphite as a pore former.

In an embodiment where ceramic greenware 10 includes graphite, the graphite content is >5%, this weight percent being measured as (A/B)·100, wherein A is the weight percent of graphite and B is the total weight percent of inorganics. Thus, for example, in the example set forth in Table 2 below, the graphite content is given by (20/100)·100=5%.

Example values for tan(δ) for example ceramic greenwares 10 are provided in Table 1, below.

TABLE 1

| Example # | ε' | ε" | tan δ | OFA |
|---|---|---|---|---|
| Example 1 | 11.472 | 0.924 | 0.08054 | about 60% |
| Example 2 | 2.9 | 0.483 | 0.16655 | about 80% |
| Example 3 | 7.8 | 0.4 | 0.0512 | about 60% |
| Example 4 | 10.744 | 0.612 | 0.05696 | about 60% |
| Example 5 | 9.96 | 1.24 | 0.1245 | about 60% |

Where OFA is open frontal area. Examples 1 and 2 are dry (e.g., about 60%-100% dryness). Examples 3, 4, and 5 are wet (e.g., about 0%-40% dryness or about 0%-10% dryness). Table 2 below sets forth an example high-graphite-content ceramic greenware composition as in Examples 1 and 2.

TABLE 2

| GENERAL MATERIAL | SPECIFIC MATERIAL | | wt % |
|---|---|---|---|
| INORGANICS | talc | | 41.39 |
| | alumina | | 36.65 |
| | silica | | 21.96 |
| | | Totals | 100 |
| PORE FORMERS | graphite | | 20.00 |
| | starch | | 20.00 |
| | | Totals | 140 |

TABLE 2-continued

| GENERAL MATERIAL | SPECIFIC MATERIAL | wt % | |
|---|---|---|---|
| SOLID BINDERS/ORGANICS | methylcellulose | | 4.50 |
| | | Totals | 144.5 |
| LIQUID ADDITIONS DURING DRY BLENDING | fatty acid, tall oil | | 1.20 |
| | | Totals | 145.7 |
| | | Grand Total = | 145.70 |

Table 3 below sets forth an example non-high-graphite-content ceramic greenware composition as in Examples 3, 4, and 5.

TABLE 3

| GENERAL MATERIAL | SPECIFIC MATERIAL | wt % | |
|---|---|---|---|
| INORGANICS | talc | | 40.38 |
| | alumina | | 18.64 |
| | silica | | 6.00 |
| | clay | | 34.99 |
| | | Totals | 100 |
| SOLID BINDERS/ORGANICS | methylcellulose | | 2.90 |
| | stearic acid | | 0.59 |
| | | Totals | 103.5 |
| LIQUID ADDITIONS DURING DRY BLENDING | fatty acid, tall oil, Durasyn ®162 | | 6.00 |
| | | Totals | 145.7 |
| | | Grand Total = | 145.70 |

The ceramic greenwares 10 as considered herein can be formed by extruding a plasticized batch material comprising ceramic-forming components, or ceramic precursors (e.g., such as set forth above in Table 2), through a die, such as a die that produces a honeycomb structure, to form an extrudate of the ceramic-forming material. The extrudate that exits the extruder is cut transversely to the direction of extrusion to form a greenware piece. The piece may itself be transversely cut into shorter pieces, e.g., after drying. In some cases, the longer piece is referred to as a "log." Extruded pieces of ceramic greenware 10 contain water (for example, 10%-25% by weight), and the ceramic greenware needs to be dried prior to the formation of the final product (article).

The systems and methods disclosed herein reduce the occurrence and/or intensity of non-uniform heating and drying that result from drying the ceramic greenware to the extent that is sufficient for preparing the greenware for firing at high temperature. In particular, the drying systems and methods disclosed herein are directed to rapidly drying the ceramic greenware in a manner that substantially reduces or eliminates end defects.

Figure 2:
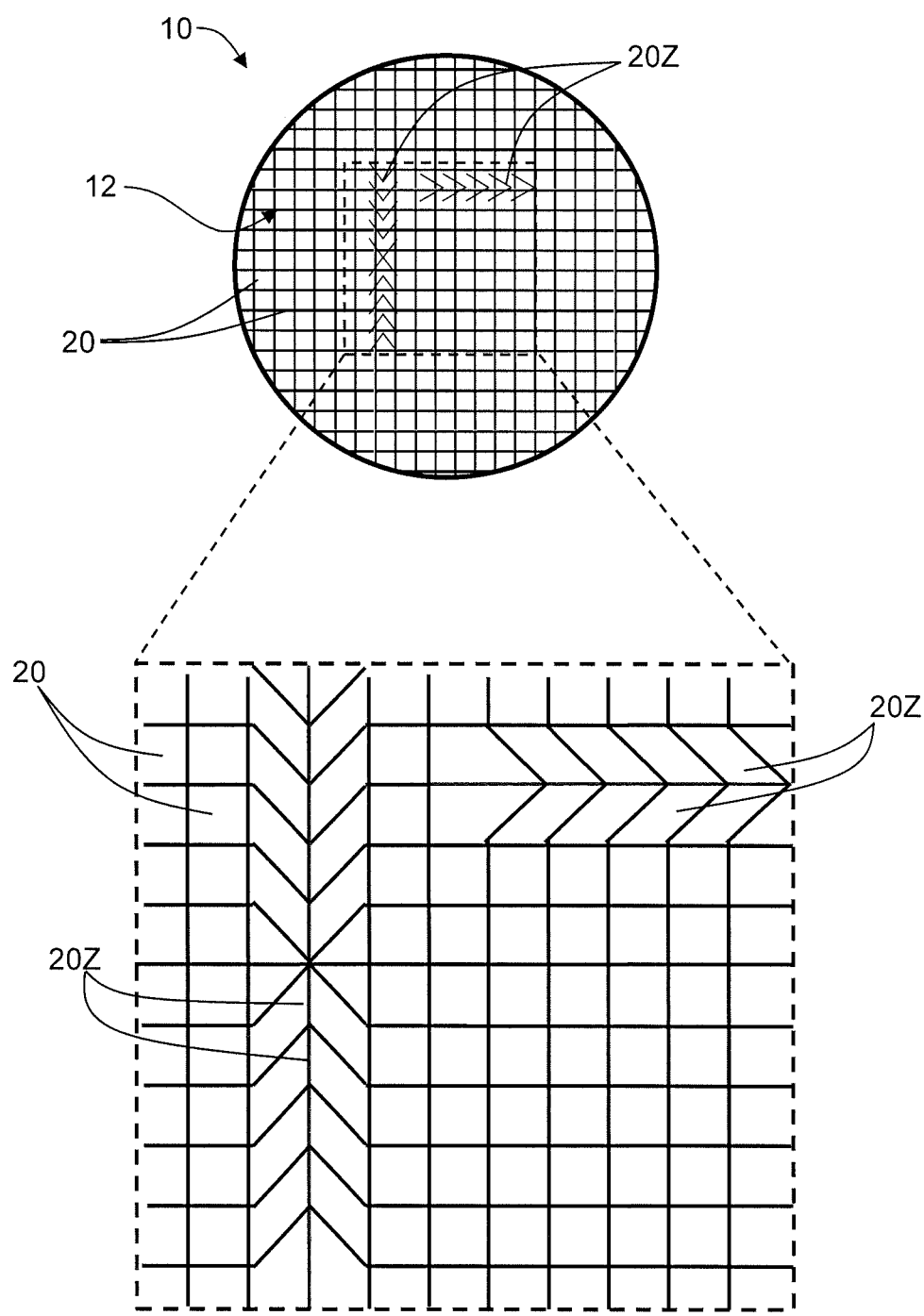
FIG. 2 is a view of the front end of a ceramic greenware that shows in a close-up inset view defective Z-cells that have a distorted Z-shape as caused by uneven heating at the ends of the ceramic greenware as compared to the middle during microwave drying.

FIG. 2 is a view of front end 12 of an example ceramic greenware 10 that shows an example of "Z cells" 20Z, which are defective cells 20 having a distorted Z-shape, as best seen in the close-up inset view. The Z-cell defects are caused during microwave drying by a drop in the amount of microwave power at front and back ends 12 and 14 of ceramic greenware 10 relative to the center. This causes the collapse of some of cells 20, which thereby form Z-cells 20Z. The collapse tends to occur within a depth of about 2.5" (6.35 cm) of front and back ends 12 and 14 of ceramic greenware 10.

It is emphasized here that the occurrence of such end defects during the microwave-drying process may require the ends of ceramic greenware 10 to be cut off to remove the defective portions. This loss of material incurred during the manufacturing of the end-product ceramic articles translates into a significant annual financial loss. Reducing the defect depth from about 2.5" to about 1" would represent a substantial cost savings.

It is also desirable in the manufacturing process to dry the ceramic greenwares 10 as fast as possible while also keeping the drying process as defect-free as possible. The limitations on how fast ceramic greenwares 10 can be dried are largely a function of the amount of water in the ceramic greenware, the water removal rate and the stresses associated with shrinkage or shape change during the drying process. During the drying process, water from the interior of ceramic greenware 10 has to either travel down cells 20 to front or back ends 12 or 14, or must diffuse through a number of cell walls 22 to exit at outer surface 16. The water (moisture) removal rate at a given pressure is a function of temperature (which defines the rate of transition from the liquid state to the gas state) and the physical removal of the water (i.e., the movement of the high moisture-laden air away from outer surface 16).

Figure 3:
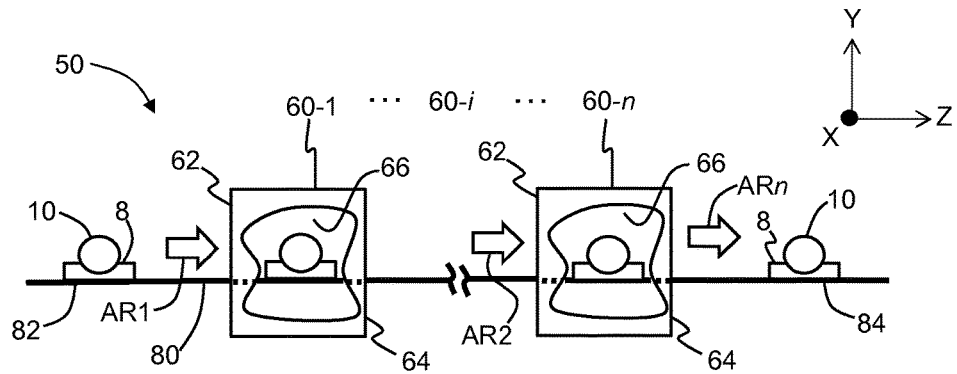
FIG. 3 is a schematic diagram of a drying system that includes a series of applicators through which the ceramic greenware is conveyed during the drying process.

FIG. 3 is a schematic diagram of an example drying system 50 that includes one or more applicators 60, such as a first applicator 60-1 through an $n^{th}$ applicator 60-n, as shown. Each applicator 60 includes an input end 62, an output end 64, and an interior 66. The drying system 50 includes a conveyor 80 having an input area 82 adjacent input end 62 of first applicator 60-1, and an output area 84 adjacent output end 64 of $n^{th}$ applicator 60-n. The ceramic greenware 10 is shown as being supported by a tray 8, which in turn is supported on conveyor 80. Arrows AR1 through ARn show the direction of movement of ceramic greenware 10 and tray 8 through drying system 50, namely, the Z-direction. The ceramic greenware 10 and tray 8 are provided on input area 82 of conveyor 80 and are removed from the conveyor at output area 84 at the completion of the drying process.

A given applicator 60 is configured to perform either microwave (MW) drying, close-coupled hot-air (CCHA) drying, or both MW drying and CCHA drying. Thus, drying system 50 is configured to perform both MW drying and CCHA drying using one or more applicators 60. Examples of CCHA drying as employed in drying system 50 are discussed in greater detail below.

Figure 4A:
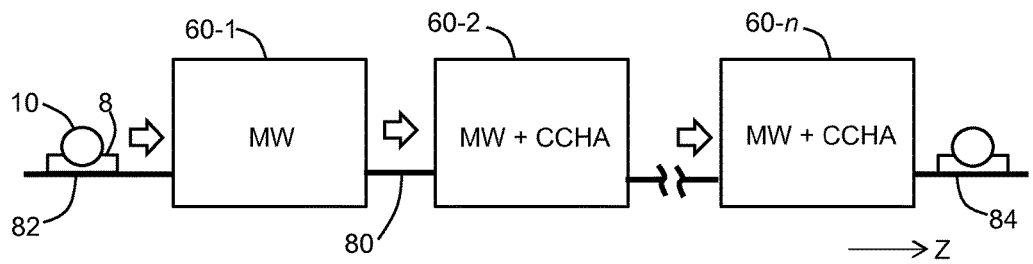
FIGS. 4A through 4H are similar to FIG. 3 and illustrate drying-system configurations and associated ceramic-greenware drying methods that employ various combinations of microwave (MW) drying and close-coupled hot-air (CCHA) drying.

FIGS. 4A through 4H are similar to FIG. 3 and show a number of example configurations for drying system 50 that illustrate different drying methods for ceramic greenware 10. FIG. 4A illustrates an example embodiment wherein first applicator 60-1 performs MW drying and one or more downstream applicators 60-2, . . . 60-n are used to perform a combination of MW and CCHA drying. The combination of MW and CCHA drying constitutes a hybrid drying mode.

For example, MW drying is used first to dry ceramic greenware 10 to between 50% and 70% dryness. This level of drying is sufficient to ensure that the exterior dimensions of ceramic greenware 10 do not change dramatically on further drying, i.e., most of the shrinkage occurs in the first applicator. Then, ceramic greenware 10 is further dried (e.g., to greater than 98% dryness) using a combination of MW and CCHA drying. In another example, first applicator 60-1 is used to perform MW drying to about 30% dryness so that most (but not all) of the drying shrinkage occurs. Then, in one or more downstream applicators 60-2, . . . 60-n, a combination of CCHA drying and MW drying is employed until the final target dryness (e.g., greater than 98% dryness) is achieved.

Figure 4B:
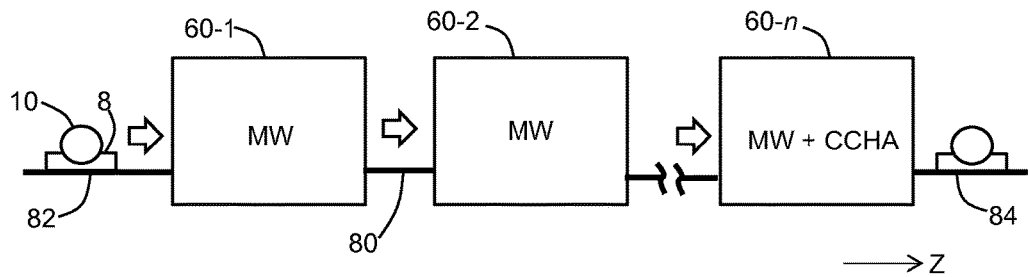

FIG. 4B is similar to FIG. 4A and illustrates an example drying method wherein applicators 60-1 to 60-(n−1) employ MW drying to dry ceramic greenware 10 to up to about 75% dryness. Then, the last applicator 60-n dries ceramic greenware 10 using MW+CCHA drying to the final target dryness.

Figure 4C:
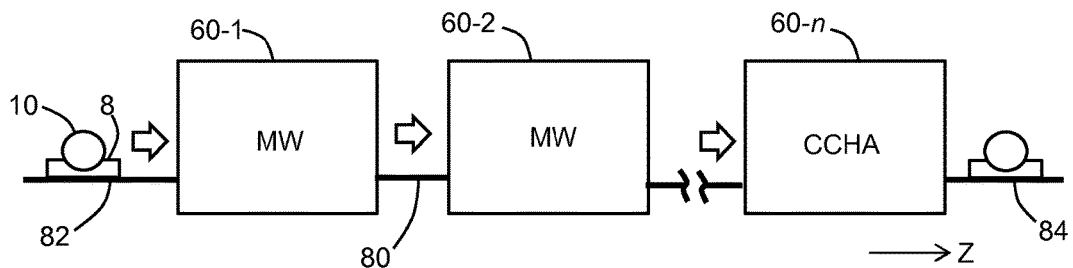

FIG. 4C is similar to FIG. 4B and illustrates an example drying method wherein applicators 60-1 to 60-(n−1) employ MW drying to dry ceramic greenware 10 to up to about 75% dryness. Then, the last applicator 60-n dries ceramic greenware 10 using CCHA drying to the final target dryness. By having only the last applicator 60-n use exclusively CCHA drying, the coupling distance Δx (introduced and discussed below) can be 0.

Figure 4D:
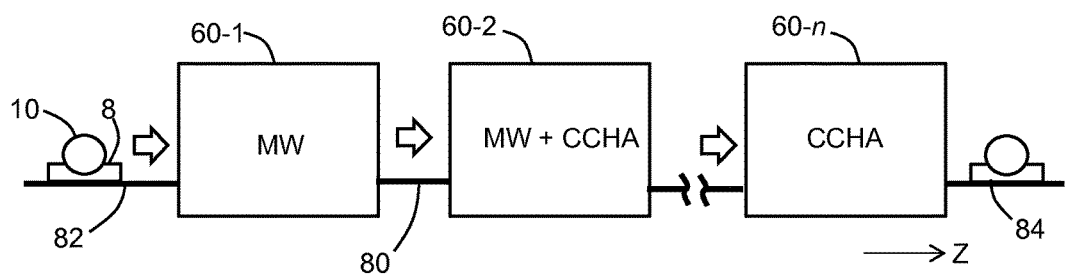

FIG. 4D is similar to FIG. 4C and illustrates an example drying method wherein first applicator 60-1 employs MW drying to dry ceramic greenware 10 to up to about 30% dryness. Then, applicators 60-2 to 60-(n−1) dry ceramic greenware 10 using MW+CCHA drying to up to about 90% dryness. Then, the last applicator 60-n employs only CCHA to bring ceramic greenware 10 up to its final target dryness. Again, by having the last applicator 60-n use only CCHA drying, the coupling distance Δx (introduced and discussed below) can be 0.

Figure 4E:
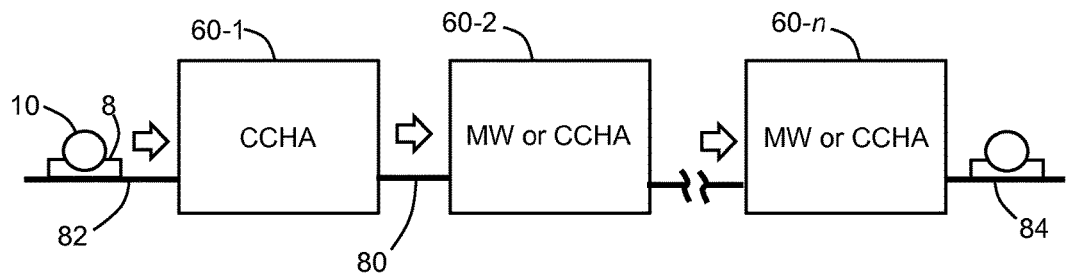

FIG. 4E is similar to FIG. 4D and illustrates an example drying method wherein first applicator 60-1 employs CCHA drying to dry ceramic greenware 10 to up to a select level of dryness, and then the remaining one or more applicators 60-2 to 60-n employ MW drying or CCHA drying to dry ceramic greenware 10 up to its final target dryness. By having first applicator 60-1 use only CCHA drying, the coupling distance Δx (introduced and discussed below) can be 0. By having first applicator 60-1 use only CCHA drying, Z-cell defects can be reduced or avoided.

Figure 4F:
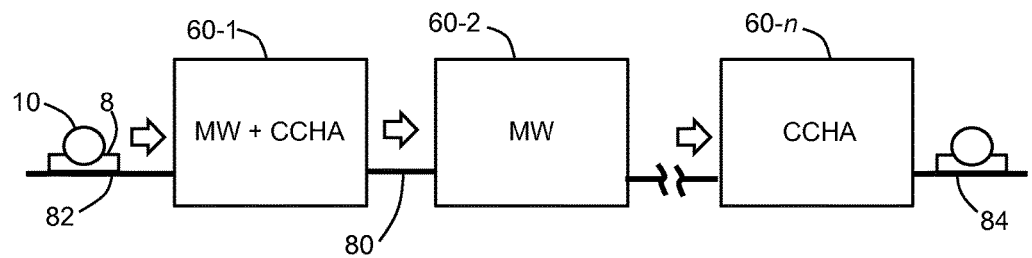

FIG. 4F is similar to FIG. 4E and illustrates an example drying method wherein first applicator 60-1 employs MW+CCHA drying to dry ceramic greenware 10 to up to a first dryness. By having first applicator 60-1 use MW+CCHA drying, Z-cell defects can be reduced or avoided. Then, MW drying is employed in one or more downstream applicators 60-2 to 60-(n−1) to dry ceramic greenware 10 up to a second dryness. Then, the last applicator 60-n employs CCHA drying to dry ceramic greenware 10 to its final target dryness. In an example embodiment, a plate can be arranged at front or back end 12 or 14 of ceramic greenware 10 to generate heat when MW drying is used. An example plate is made of SiC, which interacts with microwaves. Then, a regular blower or vacuuming device can be used to create pressure gradients across cells 20 to drive air through the cells.

Figure 4G:
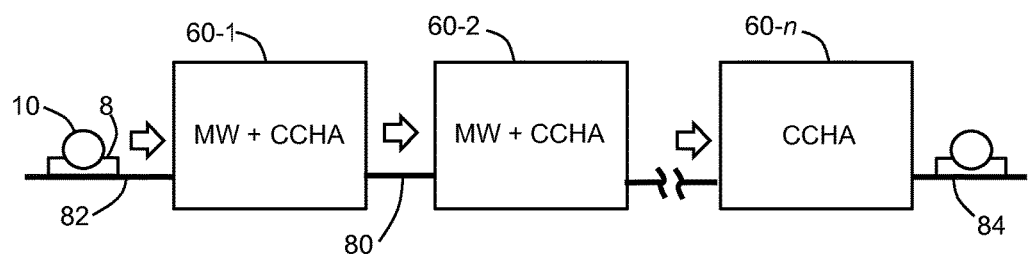

FIG. 4G is similar to FIG. 4F and illustrates an example drying method wherein one or more applicators 60-1 through 60-(n−1) employ MW+CCHA drying to dry ceramic greenware 10 to up to a first (initial) dryness. In an example embodiment, the first dryness is up to 10%. Then, the final applicator 60-n employs CCHA drying to dry ceramic greenware 10 to its final target dryness.

Figure 4H:
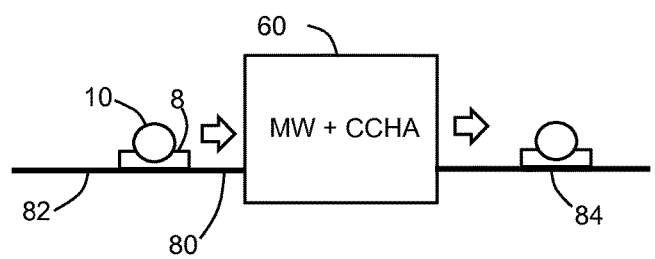

FIG. 4H illustrates an embodiment wherein a single applicator 60 that has both MW and CCHA capability is employed to perform MW+CCHA drying. The drying of ceramic greenware 10 can be either in sequence (i.e., MW drying and then CCHA drying, or CCHA drying and then MW drying) or simultaneous MW and CCHA drying. The use of a single applicator 60 to perform both MW and CCHA drying is advantageous in that it saves space.

Figure 5A:
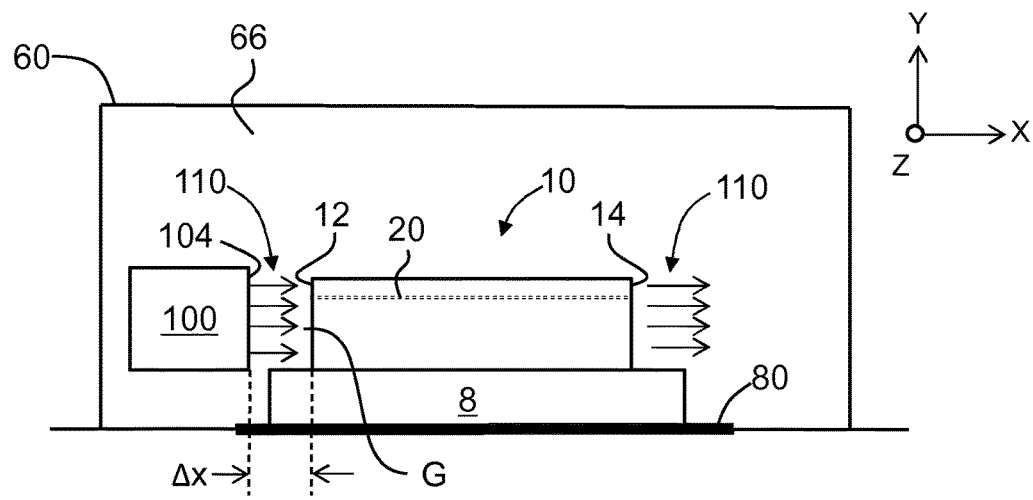
FIGS. 5A and 5B are views of an applicator looking in the −z direction and showing a ceramic greenware therein, and also showing a CCHA drying system operably arranged relative to the ceramic greenware, with FIG. 5B additionally including the MW-drying capability.

FIG. 5A is a view looking in the +Z direction of an example applicator 60 configured to perform CCHA drying of ceramic greenware 10. The ceramic greenware 10 and tray 8 are conveyed by conveyor 80 in the +Z direction, i.e., out of the page of the drawing. The applicator 60 includes a CCHA drying system 100 that has an output end 104 from which hot air 110 is emitted. The CCHA drying system 100 is arranged with output end 104 adjacent front end 12 of ceramic greenware 10 to form a gap G that defines a coupling distance Δx. This configuration allows for CCHA drying system 100 to direct hot air 110 into ceramic greenware 10 at front end 12 so that the hot air flows through cells 20 and exits the cells at back end 14. That is, the greenware 10 (log) is dried while disposed horizontally.

Figure 5B:
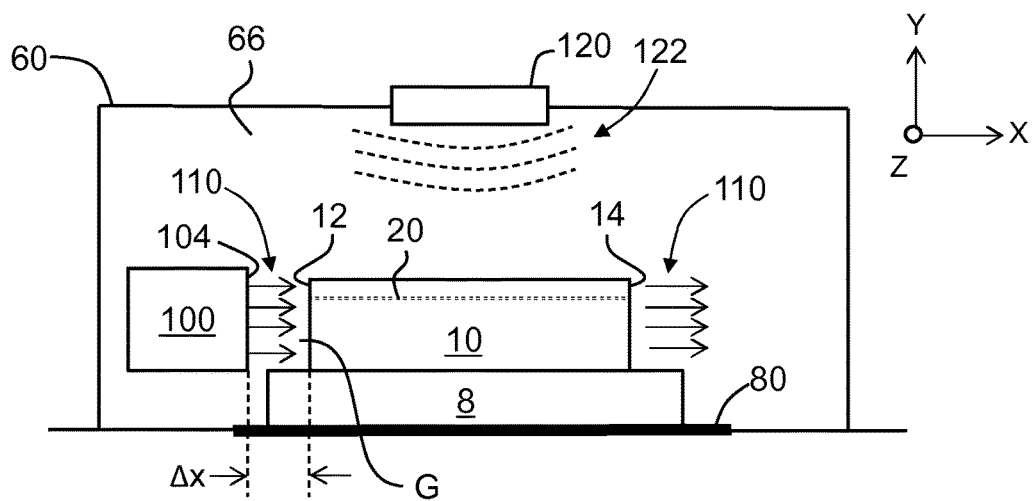

FIG. 5B is similar to FIG. 5A, except that applicator 60 further includes a microwave source 120 that outputs microwaves 122 to perform MW drying. Thus, FIG. 5B shows an example of applicator 60 that can perform hybrid drying, i.e., MW+CCHA drying.

Figure 6A:
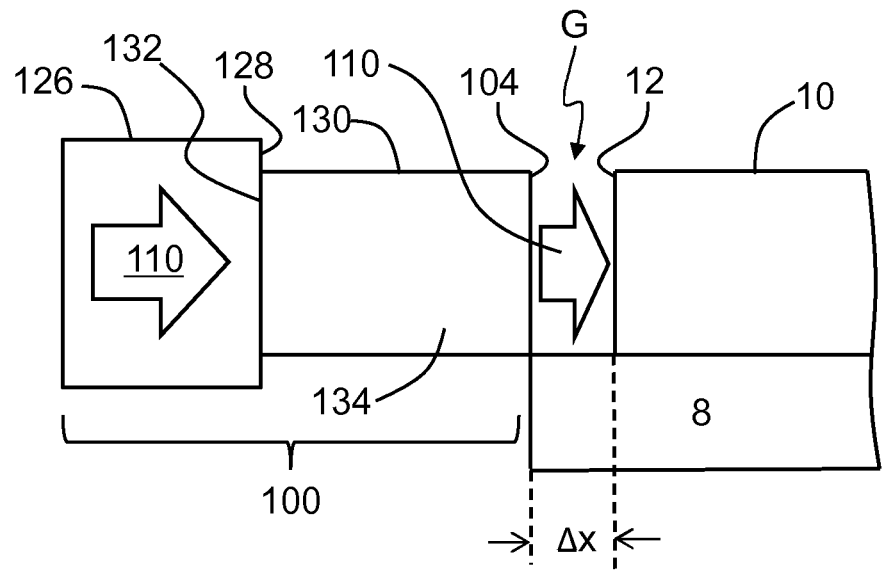
FIGS. 6A through 6I are close-up views of the ceramic greenware front end and illustrate different configurations of the ceramic greenware and the CCHA drying system to illustrate CCHA drying methods.
Figure 6B:
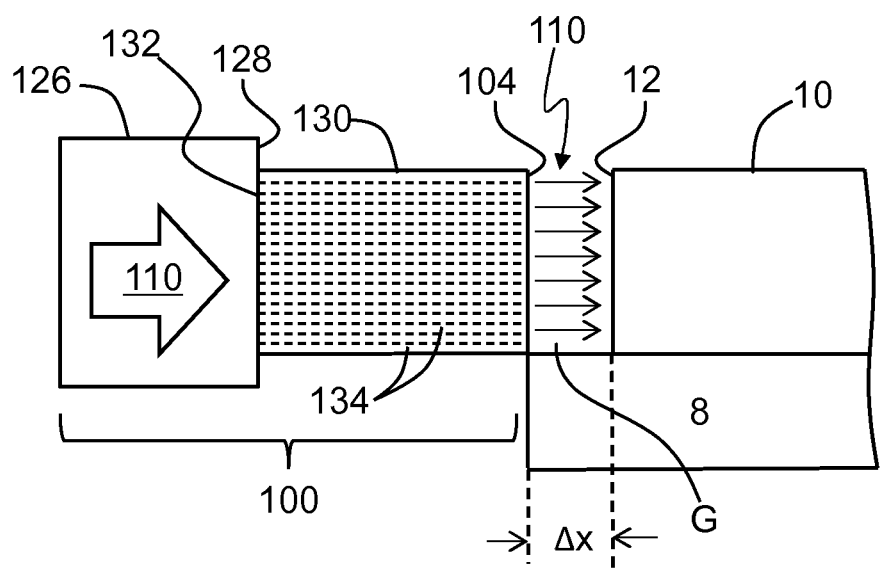
Figure 6C:
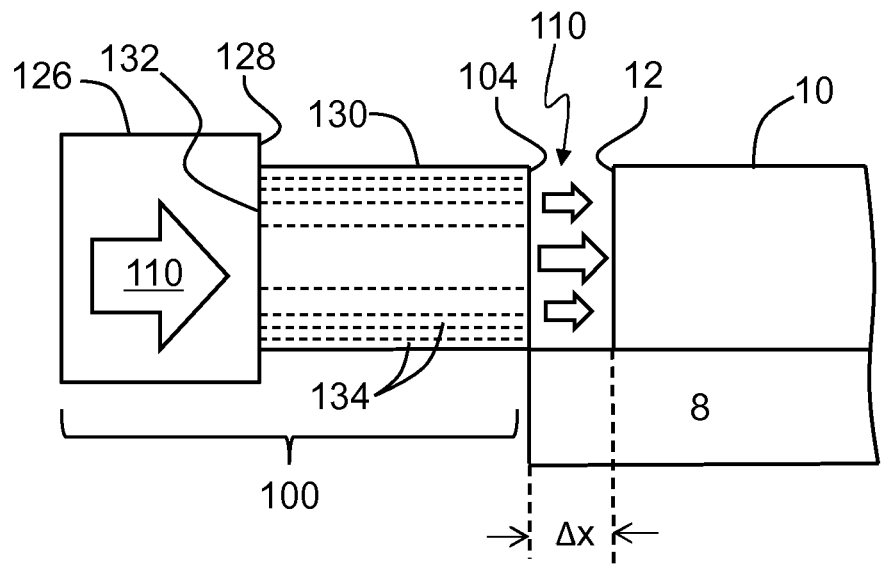

FIGS. 6A through 6C are close-up views of front end 12 of ceramic greenware 10, along with an example CCHA drying system 100 that includes a blower 126 and an air-guide device 130. Blower 126 has an output end 128, and air-guide device 130 has an input end 132 and an output end that defines output end 104 of CCHA drying system 100. The input end 132 of air-guide device 130 is operably coupled to output end 123 of blower 121. The blower 126 is configured to generate hot air 110 having a select temperature and a select flow rate (pressure). The hot air 110 can have a temperature range from about ambient temperature to about 180° C., for example, from about ambient temperature to about 150° C., from about ambient temperature to about 140° C., from about ambient temperature to about 110° C., or even from about ambient temperature to about 80° C., where ambient temperature is room temperature or about 20-24° C. The hot air 110 can have various levels of humidity, for example, the hot air 110 can have a humidity from 0 to about 80% RH at about 80° C., where RH is relative humidity.

In an example embodiment, air-guide device 130 includes a tube that has either a single channel 134 as illustrated in FIG. 6A, or multiple channels 134, as illustrated in FIGS. 6B and 6C. When air-guide device 130 has multiple channels 134, it can serve as an air manifold that can provide select amounts of flow of hot air 110 as a function of position at output end 104. FIG. 6B shows an example wherein channels 134 all have the same size and provide a substantially uniform flow of hot air 110. FIG. 6C shows an example where channels 134 are not all the same size and prove a spatially modulated flow of hot air 110. In an example embodiment, air-guide device 130 defines an "air knife" that defines a select flow pattern for hot air 110 entering front end 12 of ceramic greenware 10.

Figure 6D:
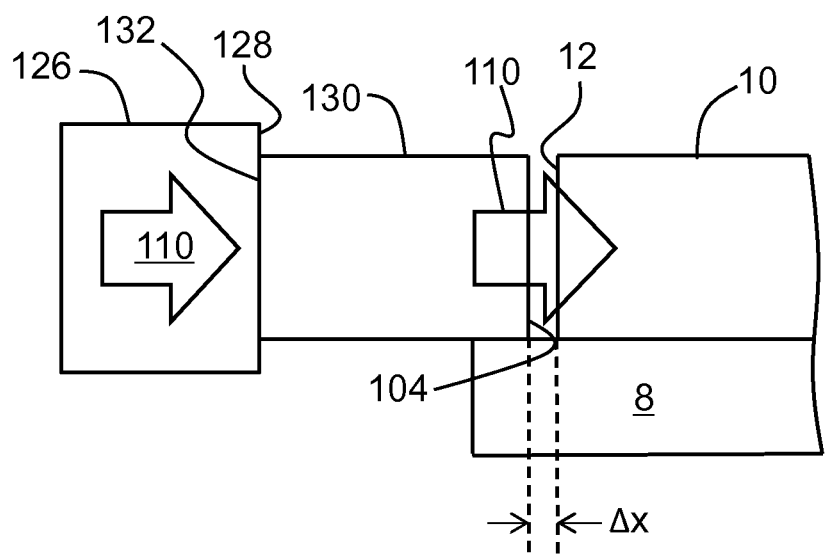

In an example embodiment illustrated in FIG. 6D, the size of gap G and thus the coupling distance Δx is adjustable. The coupling distance Δx can be adjusted, for example, by moving output end 104 of air-guide device 130 closer to front end 12 of ceramic greenware 10. In one example, coupling distance Δx can be in the range defined by 0"≤Δx≤10" (0 cm≤Δx≤25.4 cm), while in another example, the coupling distance Δx can be in the range defined by 0"≤Δx≤2" (0≤Δx≤5.08 cm).

Figure 6E:
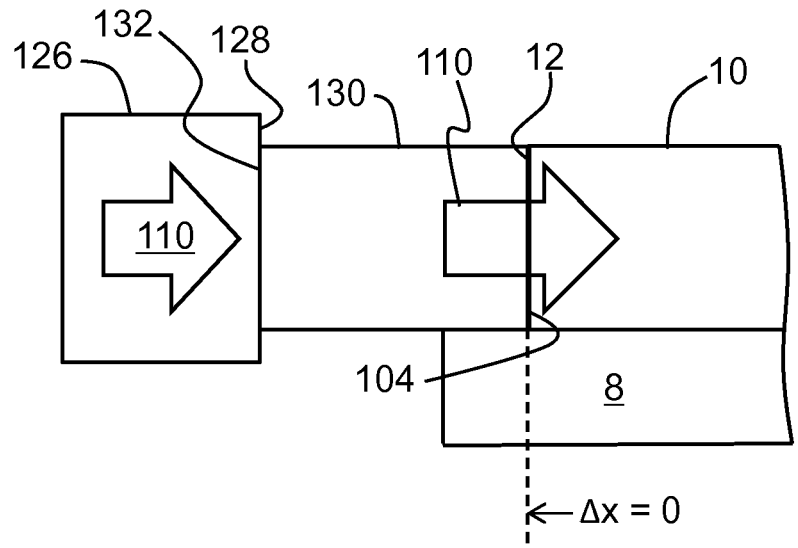

FIG. 6E illustrates an example embodiment wherein the coupling distance Δx=0. This is accomplished by contacting output end 104 of air-guide device 130 with front end 12 of ceramic greenware 10. In an example, the coupling distance Δx is made as small as possible, e.g., 0.5 mm, so that air-guide device 130 is not in actual contact with ceramic greenware 10 but is so close that the coupling efficiency is substantially the same as it would be were the two in contact.

Figure 6F:
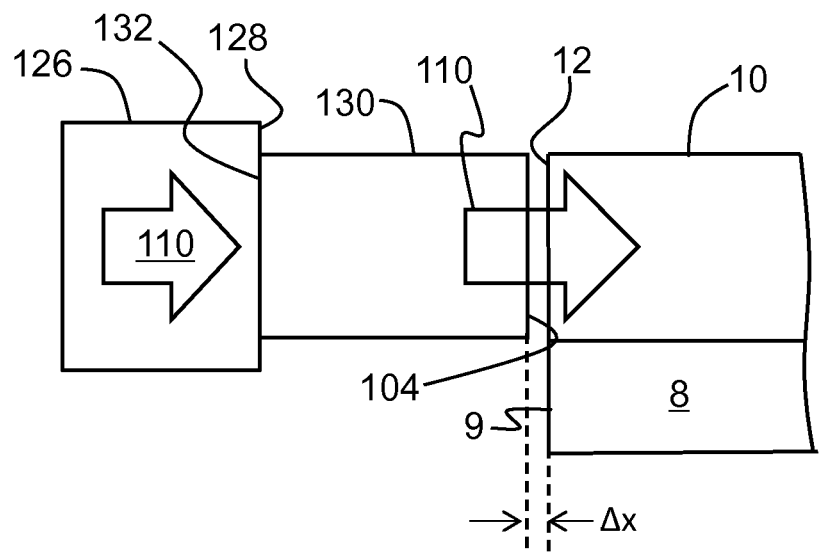

FIG. 6F is similar to FIG. 6E and illustrates an example wherein tray 8 has an edge 9, and wherein front end 12 of ceramic greenware 10 is substantially flush with or slightly overhangs the tray edge. This configuration can be used to facilitate the coupling of hot air 110 into front end 12 of ceramic greenware 10 without the interference of tray 8.

Figure 6G:
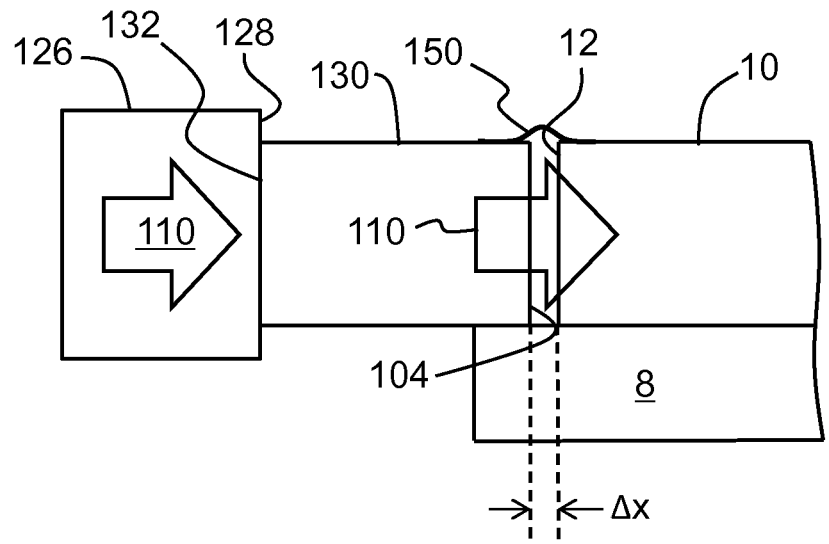

FIG. 6G is similar to FIG. 6C and illustrates an example embodiment wherein a coupling member 150 is employed between output end 104 of air-guide device 130 and front end 12 of ceramic greenware 10 to facilitate the coupling of hot air 110 into the ceramic greenware. An example coupling member 150 includes or consists of a cylindrical sleeve that covers gap G. The coupling member 150 may include a longitudinal opening that accounts for the presence of tray 8. In an example, coupling member 150 is configured so that gap G is at least partially closed off, while in another example the gap is entirely closed off. In an example, the coupling member 150 is configured so that gap G is closed off in part by tray 8 and in part by the coupling member. In an example, coupling member 150 is flexible (e.g., like a blanket), while in another example it is rigid (e.g., is a metal bracket or sleeve). An example material for a flexible coupling member 150 is rubber.

Figure 6H:
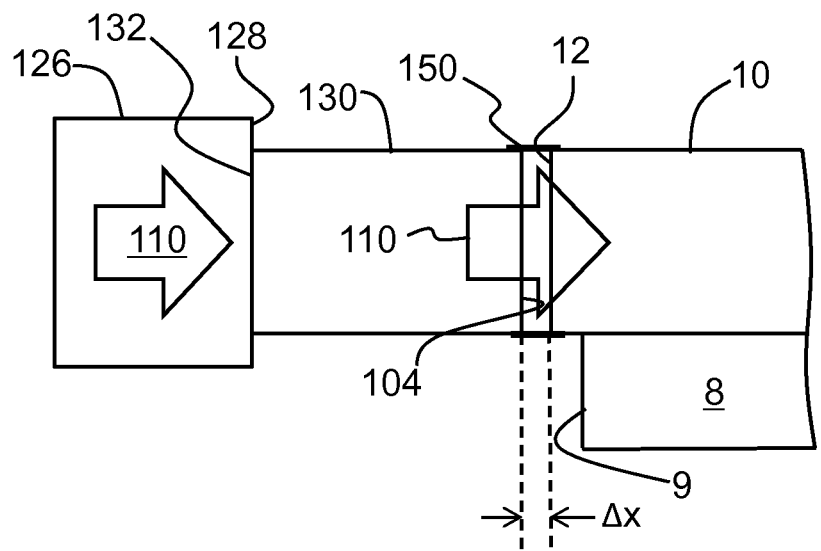

FIG. 6H is similar to FIG. 6G and shows an example coupling member 150 used in the configuration where ceramic greenware 10 extends over edge 9 of tray 8. This configuration facilitates the use of a contiguous coupling member 150, i.e., the coupling member does not need to have an opening or be otherwise configured to accommodate tray 8.

Figure 6I:
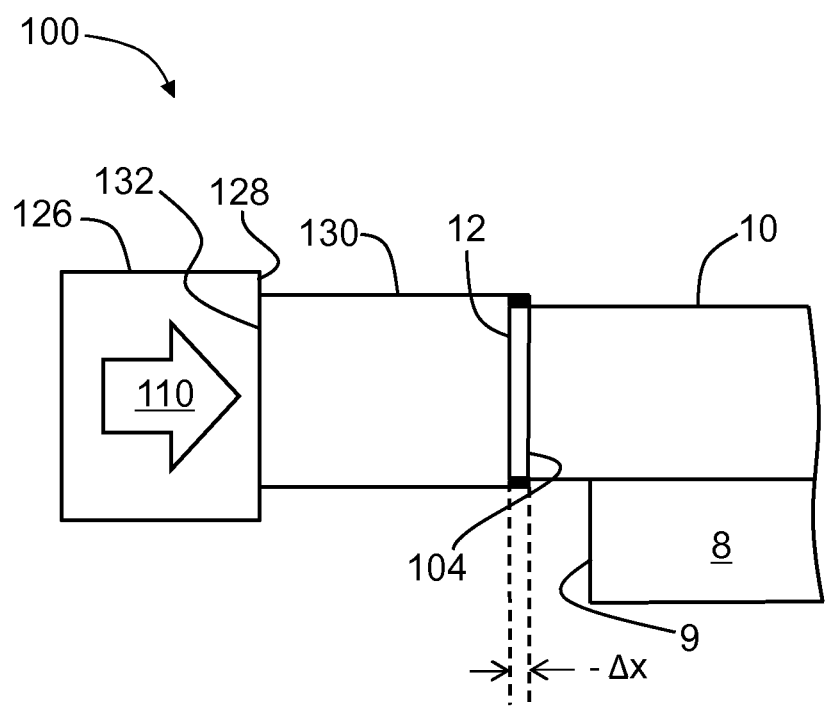

FIG. 6I is similar to FIG. 6H and illustrates an example configuration where front end 12 of ceramic greenware 10 resides within output end 104 of air-guide device 130, in which in this case the coupling distance $\Delta x$ can be considered as having a negative value. Thus, in an example, the lower value of $\Delta x$ can be $-2"$ ($-5.08$ cm) even $-1"$ ($-2.54$ cm). In an example, coupling member 150 can be configured to seal off any gaps that exist between air-guide device 130 and ceramic greenware 10 to optimize the coupling efficiency.

Figure 7A:
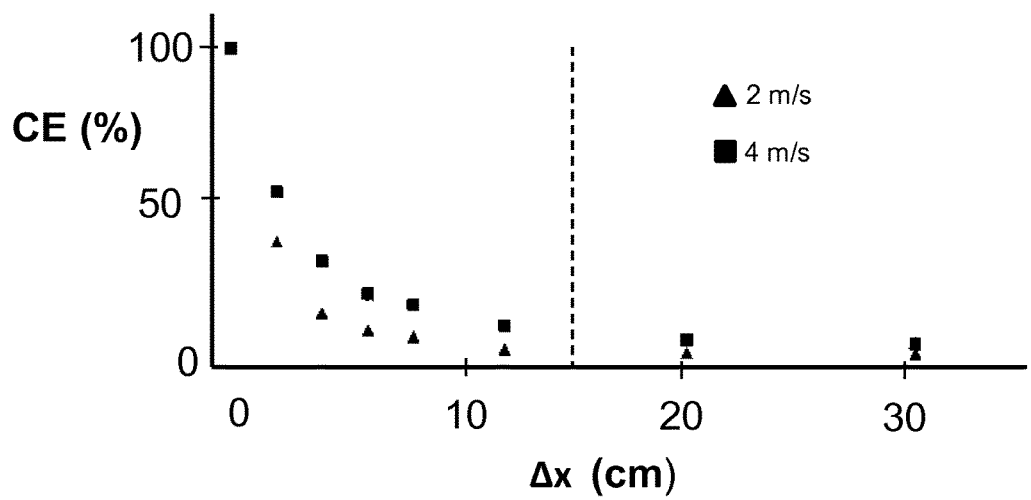
FIG. 7A is a plot of the coupling efficiency CE (%) versus the coupling distance Δx (cm) based on a fluid-dynamics simulation that illustrates the effect of coupling efficiency on coupling distance for hot-air input velocities $V_I$ of 4 m/s (squares) and 2 m/s (triangles).

FIG. 7A is a plot of the coupling efficiency CE (in %) of heated air 110 into an example ceramic greenware 10 as a function of coupling distance $\Delta x$ (in cm) as determined by a fluid-dynamics computer simulation for flow velocities of 2 m/s (triangles) and 4 m/s (squares). In an example, the coupling efficiency CE is defined as the flow rate of heated air 110 into front end 12 of ceramic greenware 10 divided by the flow rate of heated air exiting at back end 14. The plot of FIG. 7A indicates that the coupling efficiency CE drops off to below 20% for both flow velocities when the coupling distance $\Delta x$ exceeds 10 cm but is 100% for $\Delta x=0$. The coupling efficiency CE also drops off faster at short coupling distances than at longer coupling distances.

Figure 7B:
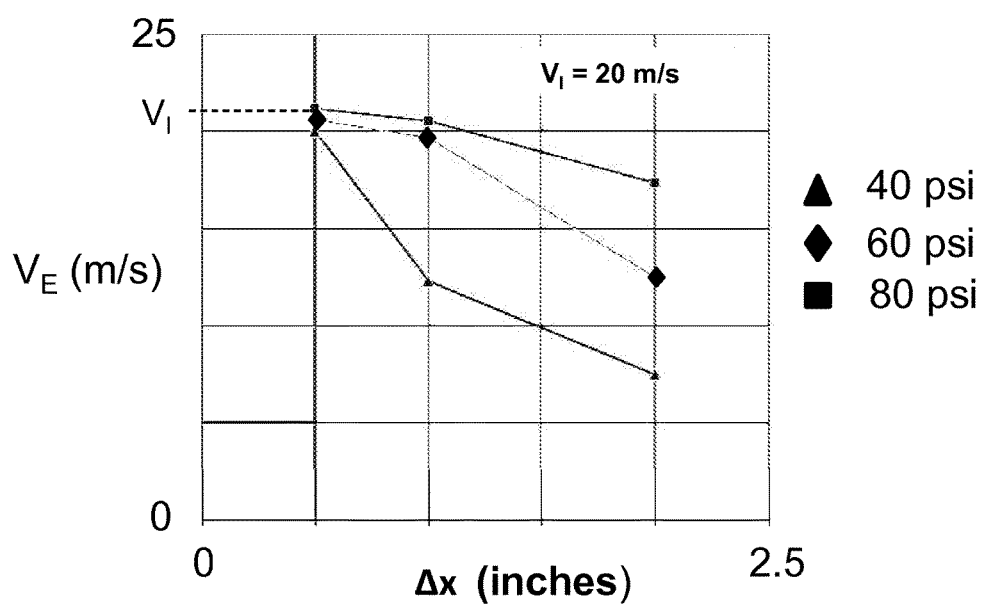
FIG. 7B is a plot of the exit velocity $V_E$ (m/s) versus the coupling distance Δx (inches) for an input velocity $V_I$ of 20 m/s for pressures of 40 psi (triangles), 60 psi (diamonds) and 80 psi (squares).

FIG. 7B is a plot of the exit velocity $V_E$ (m/s) versus coupling distance $\Delta x$ (inches) based on actual measurements performed on an example ceramic greenware 10 having dimensions D=4.66" (11.84 cm), L=6" (15.24), $\rho$=600, and TH=3.5 mil (88.9 microns). An air knife was used for the CCHA drying system 100. The input flow velocity $V_I$ was 20.8 m/s. The three curves are for pressures of 40 psi (triangles), 60 psi (diamonds) and 80 psi (squares). The coupling efficiency $CE=V_E/V_I \approx 30\%$ for $\Delta x=2$ inches.

In an example embodiment, the volumetric flow rate $R_V$ of hot air 110 from CCHA drying system 100 is in the range defined by 50 scfm$\leq R_V \leq$1500 scfm, wherein "scfm" stands for "standard cubic feet per minute." In an example, the coupling efficiency CE is 50% or greater, or even 80% or greater. Example drying times $t_D$ for drying ceramic greenware 10 from start to finish are in the range from 5 minutes to 30 minutes. These drying times are substantially faster than conventional drying times, which are typically measured in hours. Thus, an aspect of the systems and methods disclosed herein includes rapid drying of ceramic greenwares 10. Such rapid drying increases the manufacturing rate of the end-product ceramic articles, thereby reducing the cost per article.

It will be apparent to those skilled in the art that various modifications to the example embodiments of the disclosure as described herein can be made without departing from the spirit or scope of the disclosure as defined in the appended claims. Thus, it is intended that the present disclosure covers the modifications and variations of this disclosure provided they come within the scope of the appended claims and the equivalents thereto.

What is claimed is:

1. A method of drying an extruded ceramic greenware having an array of open longitudinal cells and opposite input and output ends, comprising:
   drying of the ceramic greenware to form a partially dried ceramic greenware having a dryness of 10% or less, wherein the drying includes performing a first close-coupled hot-air (CCHA) drying with a coupling distance $\Delta x$ having a value in a range defined by $-2" \leq \Delta x \leq 10"$ and the first CCHA drying is performed while the ceramic greenware is disposed horizontally;
   drying the partially dried ceramic greenware to a target dryness of at least 98% to form a dried ceramic greenware, wherein drying the partially dried ceramic greenware includes performing at least one of microwave drying and at least a second CCHA drying; and
   wherein the ceramic greenware from 0% to 10% dryness has a dielectric constant $\varepsilon = \varepsilon' + i\varepsilon''$ that defines a loss tangent $\tan(\delta) = \varepsilon''/\varepsilon' \geq 0.05$.

2. The method of claim 1, wherein the CCHA drying system comprises an air-guide device with one or more channels, and wherein the method further comprises directing the hot air through the one or more channels.

3. The method of claim 1, wherein passing CCHA through the ceramic greenware from the input end to the output end comprises at least one of blowing and vacuuming.

4. The method of claim 1, including performing the acts therein so that the dried ceramic greenware has a reduced number of end defects as compared to a number of end defects formed when carrying out the drying process using only microwave drying.

5. The method of claim 1, wherein the ceramic greenware has a diameter D in the range $3" \leq D \leq 20"$.

6. The method of claim 1, wherein the longitudinal cells are defined by cell walls having a thickness TH in the range 1 mil$\leq D \leq$15 mils.

7. The method of claim 1, wherein the ceramic greenware contains graphite and a total amount of inorganics, and wherein the amount of graphite is greater than 5 wt % measured relative to the total amount of inorganics.

8. The method of claim 1, wherein drying the partially dried ceramic greenware includes performing at least one microwave drying.

9. The method of claim 8, wherein the performing of the at least one microwave drying includes performing multiple microwave drying steps sequentially in multiple microwave applicators.

10. The method of claim 1, wherein the coupling distance $\Delta x$ has a value in a range defined by $-2''\le\Delta x<0''$.

11. The method of claim 1, wherein the first CCHA drying comprises directing hot air into the ceramic greenware using an air-guide device that comprises a tube.

12. A method of drying an extruded ceramic greenware having an array of open longitudinal cells, an input end, and an output end, the method comprising:

contacting an air-guide device with at least one of the input end and the output end of the ceramic greenware to form a coupling distance $\Delta x$ between the air guide and the ceramic greenware having a value of $\Delta x<0''$; and flowing hot air through the air-guide device and into the ceramic greenware to dry the ceramic greenware, wherein the contacting and the flowing are performed while the ceramic greenware is disposed horizontally.

\* \* \* \* \*